(12) United States Patent
Grundler

(10) Patent No.: US 8,431,407 B2
(45) Date of Patent: Apr. 30, 2013

(54) TEMPERATURE/IRRADIATION/ POLYMERIZATION INDICATORS

(75) Inventor: Andreas Grundler, Wuppertal (DE)

(73) Assignee: Heraeus Kulzer GmbH, Hanau (DE)

( * ) Notice: Subject to any disclaimer, the term of this patent is extended or adjusted under 35 U.S.C. 154(b) by 1413 days.

(21) Appl. No.: 11/441,657

(22) Filed: May 26, 2006

(65) Prior Publication Data

US 2006/0280649 A1 Dec. 14, 2006

(30) Foreign Application Priority Data

Jun. 14, 2005 (DE) .......................... 10 2005 027 589

(51) Int. Cl.
*G01N 21/00* (2006.01)
*C07D 209/96* (2006.01)

(52) U.S. Cl.
USPC ........ 436/164; 422/400; 422/82.05; 548/410; 548/411; 548/147; 548/159

(58) Field of Classification Search ................... 436/164; 422/400, 82.05; 548/410, 411, 147, 159
See application file for complete search history.

(56) References Cited

U.S. PATENT DOCUMENTS

| 4,232,552 A | 11/1980 | Hof et al. |
| 4,925,727 A | 5/1990 | Brown et al. |
| 6,114,540 A * | 9/2000 | Fokas et al. ................... 548/410 |
| 6,534,657 B2 * | 3/2003 | Zhang ........................ 548/101 |
| 6,825,343 B2 * | 11/2004 | MacAlpine et al. .......... 540/145 |

FOREIGN PATENT DOCUMENTS

| DE | 37 03 080 A1 | 1/1988 |
| DE | 37 03 120 A1 | 1/1988 |
| DE | 103 09 855 B3 | 12/2004 |

OTHER PUBLICATIONS

March, Jerry et al; "Reactions, Mechanisms, and Structure"; March's Advanced Organic Chemistry—Fifth Edition; A Wiley-Interscience Publication; John Wiley & Sons, Inc. (2001); pp. 1059-1062.
Gotthardt, Hans, et al; "Darstellung und physikalische Eigenschaften mesoionischer 1,3-Dithiolone"; Institute fur Ouganische Chemie der Universitat Munchen; Chem. Ber. 109; (1976); pp. 740-752.
Gotthardt, Hans et al; "Ein neuer praparativer zungang zu thiophenderivaten durch thermische [3+2]-cycloadditionen mesoionischer 1,3-dithiolone an alkine"; Institute fur Ouganische Chemie der Universitat Munchen; Chem. Ber. 109; (1976); pp. 753-760.
Ire M; "Diarylethenes for memories and switches"; Chemical Reviews, (2000), 100, pp. 1685-1716.
Day, J. H.; "Thermochromism", Chemical Reviews, (1962), pp. 65-80.

* cited by examiner

*Primary Examiner* — Lyle Alexander
(74) *Attorney, Agent, or Firm* — Norris McLaughlin & Marcus, P.A.

(57) ABSTRACT

Temperature and/or irradiation and/or polymerization indicators comprise at least one 1,3-dipole and at least one dipolarophile, the dipole preferably being an ylide from the group of azomethines (sydnones), azomethinylides (munchnones), carbonylylides (isomunchnones), thiocarbonylylides (thioisomunchnones), or 1,3-dithiolylium-4-olates.

13 Claims, No Drawings

TEMPERATURE/IRRADIATION/POLYMERIZATION INDICATORS

The invention relates to temperature, irradiation, and polymerization indicators.

Diverse technical demands require a reliable, irreversible indicator of thermal or radiation-based exposure of materials. In various cases it may also be advantageous to be able to determine the end of a polymerization reaction in a simple manner.

Thermoindicators indicate, for example, the deterioration of heat-sensitive pharmaceuticals during transport. Such thermoindicators are commercially available for various purposes and temperature ranges.

Examples of radiation indicators include strips which, for example, measure the radiation exposure of human skin in sunlight, and change color when a set quantity of UV light is reached. These are also commercially available.

In the dental and technical fields, thermochromic and photochromic pigments are known which indicate changes in temperature or light exposure. Most of these changes, as well as the indication in a corresponding manner, are reversible. The use of irreversible color-temperature indicators in test specimens for dental polymerization devices is known from DE 103 09 855 B3.

The invention relates to temperature, irradiation, and polymerization indicators comprising at least one 1,3-dipole, in particular an ylide, preferably an ylide which absorbs in the visible region of light, and at least one dipolarophile. The invention relates in particular to temperature, irradiation, and polymerization indicators having an irreversible color change from colored to colorless.

Several categories of 1,3-dipolar compounds are described in J. March, Advanced Organic Chemistry, Wiley 2001, pages 1059-1062. Suitable as indicators are members of these substance classes in which the color change, depending on the reactants, is adjustably irreversible or is irreversible over a fairly long period of time. The members of the substance class according to the invention are intensely colored, and react irreversibly with dipolarophiles such as alkynes and alkenes with the formation of colorless bicyclic systems. The term "irreversible" is understood to mean irreversible at least over a fairly long period of time. In the case of alkynes, these compounds form stable heterocyclic 5-membered rings with evolution of gas ($CO_2$, COS, $CS_2$).

Preferred are 1,3-dipolar mesoionic heterocycles having the following types of structures:

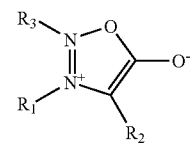 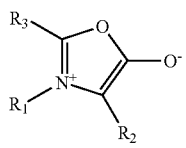

Azomethines (sydnones); Azomethinylides (munchnones);

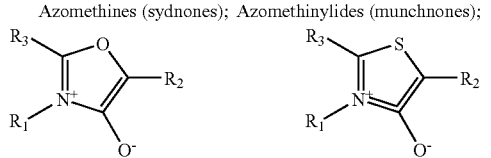

Carbonylyides (isomunchnones);   Thiocarbonylyides (thioisomunchnones);

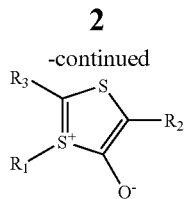

1,3-Dithiolylium-4-olates.

Such compounds have been used for over 40 years for the synthesis of 5-membered heterocyclic ring systems. Numerous authors (for example, Huisgen in the 1960s) have reported on studies concerning regio- and stereoselectivity of the Diels-Alder reaction.

Surprisingly, it has been found that the above-described compounds from classical heterocycle chemistry are very well suited for achieving the object of developing thermoindicators, photoindicators, and polymerization indicators which are as irreversible as possible and which are well adapted to the particular requirements.

As indicators in the dental field, for example, the compounds may indicate whether a heat-curing polymer has been sufficiently heated at a specified temperature. One example of a photochemical application is an indicator which indicates the end of the amount of irradiation necessary for polymerization by exhibiting decoloration. One application that is already known involves admixing with the dental composite an indicator which becomes discolorized by irradiation. However, the discoloration is used for making the composite visible by the fact that the user recognizes the depth of the required excavation for re-applying filling. In this case the discoloration is reversible (Tetric Flow Chroma from Ivoclar-Vivadent, US020020152929A1).

The aromatic ylides of the described type have a characteristic intense coloration, depending on the size of the conjugated double bond system and the concentration.

For the temperature and/or irradiation and/or polymerization indicator according to the invention, the at least one dipolarophile is preferably a singly or multiply substituted alkene or alkyne, in particular a monomer from the group of acrylates and methacrylates.

In the reaction with singly or multiply substituted alkenes or alkynes which are adapted to the reactivity of the systems, these compounds lose their color.

Examples of singly or multiply substituted alkenes are the following: Ethene, propene, 1-butene, 2-butene, isobutene, butadiene, pentene, piperylene, hexene, hexadiene, heptene, octene, diisobutene, trimethylpentene, nonene, dodecene, tridecene, tetra-bis-eicosenes, tri- and tetrapropene, polybutadienes, polyisobutenes, isoprenes, terpenes, geraniol, linalool, linalyl acetate, methylene cyclopropane, cyclopentene, cyclohexene, norbornene, cycloheptene, vinylcyclohexane, vinyloxirane, vinylcyclohexene, styrene, cyclooctene, cyclooctadiene, vinylnorbornene, indene, tetrahydroindene, methylstyrene, dicyclopentadiene, divinylbenzene, cyclododecene, cyclododecatriene, stilbene, diphenylbutadiene, vitamin A, beta carotene, vinylidene fluoride, allyl halides, crotyl chloride, methallyl chloride, dichlorobutene, allyl alcohol, methallyl alcohol, butenols, butenediols, cyclopentenediols, pentenols, octadienols, tridecenols, unsaturated steroids, ethoxyethene, isoeugenol, anethol, unsaturated carboxylic acids such as acrylic acid, methacrylic acid, crotonic acid, maleic acid, and vinylacetic acid, unsaturated fatty acids such as oleic acid, linoleic acid, and palmitic acid, and naturally occurring fats and oils. Considered as alkynes are general acetylenically unsaturated hydrocarbons containing one, two, or more triple bonds. Alkynes containing one triple bond include in particular acetylene itself, in addition to propyne, the butynes, pentynes, hexynes, heptynes, octynes, and decynes, and phenylacetylene. The acetylenically unsaturated hydrocarbons may also be substituted, and may contain, for example, one or more C—C double bonds, such as 3-methylbut-3-ene-1-yne, but-1-ene-3-yne, or acetylenes substituted by phenalene derivatives. Examples of alkynes containing two or more triple bonds include butadiyne, the hexadiynes, the octadiynes (with a conjugated or non-conjugated configuration of the multiple bonds), diethynylbenzene, 1,3,5-triethynylbenzene, or 1,2,4-triethynylbenzene. These may likewise be substituted.

The reaction of the 1,3-dipoles with such alkenes or alkynes may be carried out thermally as well as photochemically.

When ylides, for example a polymerizable monomer mixture of acrylates or methacrylates, and initiators (thermally and/or photochemically activatable) are added, the color change of the mixture indicates the progress of the reaction for a polymerization that is carried out thermally or photochemically.

Examples of suitable (meth)acrylates are the following:

Monomeric (meth)acrylates such as ethylene glycol dimethacrylate (EDMA), diethylene glycol dimethacrylate, triethylene glycol dimethacrylate (TEGDMA), glycerol dimethacrylate (GDMA), glycerol trimethacrylate, trimethylolpropane trimethacrylate, pentaerythritol dimethacrylate, pentaerythritol trimethacrylate, pentaerythritol tetramethacrylate, derivatives of bisphenol A such as bisphenol-A-dimethacrylate and bisphenol-A-diglycol dimethacrylate, urethane methacrylate obtainable from diisocyanates and hydroxyalkyl methacrylates, and reaction products of polyols, diisocyanates, and hydroxyalkyl methacrylates according to DE 37 03 080 A1 or DE 37 03 120 A1, $C_{1-12}$, preferably $C_{1-4}$ alkyl methacrylates such as methyl methacrylate, ethyl methacrylate, n-propyl methacrylate, isopropyl methacrylate, n-butyl methacrylate, and t-butyl methacrylate, hydroxyalkyl $C_{1-4}$ methacrylates such as 2-hydroxyethyl methacrylate, 2-hydroxypropyl methacrylate, diethylene glycol monomethacrylate, triethylene glycol monomethacrylate, alkoxy $C_{1-4}$ alkyl methacrylates such as 2-methoxyethyl methacrylate, 3-methoxybutyl methacrylate, and ethyl triglycol methacrylate.

When ylide and dipolarophile such as, for example, alkene and/or alkyne (optionally dissolved in a solvent) are mixed in a closed, or optionally semi-transparent or fully transparent reaction vessel, this system is suitable as a thermoindicator when packed with heat-sensitive goods, such as pharmaceuticals or foods, to indicate by a color change the condition and history of products as a function of the amount and duration of the exposure.

The quantity of energy required for the color change may be adjusted by varying the reactants and/or the concentration.

The indicator may be protected from autocycloaddition by separating the ylide and dipolarophile, for example by a deactivatable partition, and then activating the indicator anew.

Similarly, the indicator system may also be adapted with respect to radiation exposure from visible and ultraviolet light. Thus, indicators may be produced for solar radiation, either natural or from tanning beds. Use is also possible for articles of clothing in areas located under a depleted ozone layer ("ozone hole"). The indicator then indicates that the radiation exposure of the affected skin represents a hazard.

Preferred application forms contain at least one temperature and/or irradiation and/or polymerization indicator as described above, and
  are hermetically sealed with respect to mass transfer from the outside, or
  are transparent or semitransparent to enable changes or alterations in color to be perceived by an observer.

In an additional preferred application form,
  the dipolarophile is separated from the 1,3-dipole by a deactivatable partition, and
  the partition may be penetrated (deactivated) from the outside.

The invention also relates in particular to the use of the described photoindicators and/or thermoindicators and/or polymerization indicators or mixtures thereof as a thermoindicator or photoindicator for foods/food products.

The invention further relates to compositions containing
  at least one polymerizable monomer
  at least one 1,3-dipole as described hereinabove, or at least one temperature and/or irradiation and/or polymerization indicator as also described hereinabove, and
  optionally, at least one photoinitiator or at least one thermal initiator system.

Such compositions preferably represent polymerizable dental materials.

The invention further relates to a method for indicating the end of reaction of a polymerizable mixture, in which a 1,3-dipole as described hereinabove is added to the mixture as an indicator, and the end of the reaction is indicated by decoloration of the 1,3-dipole.

The following examples explain the invention in greater detail without limiting same:

EXAMPLES

The synthesis of an ylide and reaction thereof with alkenes and alkynes is described below by way of example:

Example 1

The cycloaddition with alkenes proceeds with the formation of a stable isolatable bicycle, which can be converted to the corresponding thiophene derivative by dehydration with Pd/C. The reaction sequence is illustrated below.

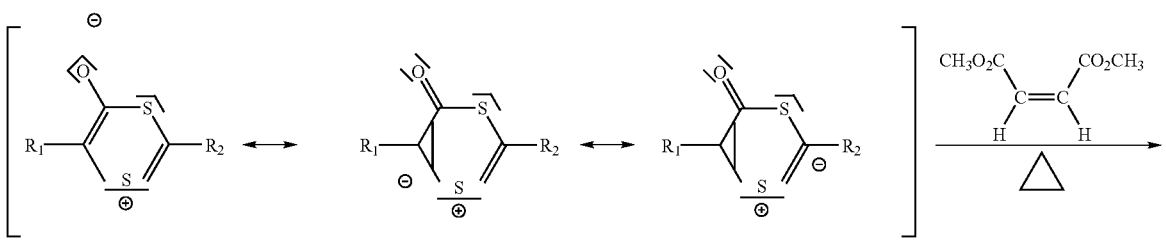

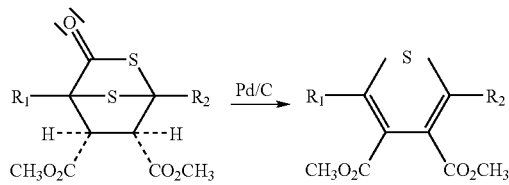

Examples of the various alkyne and alkene derivatives with which the 1,3-dithiolylium-4-olate reacts in a [3+2] cycloaddition are found in the literature as reported by H. Gotthardt, M. C. Weisshuhn, B. Christl, Chem. Ber. 109, 740-752 (1976); H. Gotthardt, M. C. Weisshuhn, B. Christl, Chem. Ber. 109, 753-760 (1976); K. T. Potts, D. N. Roy, J. Chem. Soc. Comm. 1968, 1061; H. Gotthardt, B. Christl, Tetrahedron Letters 1968, 4751-4756; and H. Gotthardt, B. Christl, Tetrahedron Letters 1968, 4747-4749.

The completion of the reaction is identified, both for the reaction with alkynes to produce the thiophene derivatives and the reaction with alkenes to produce the adduct, by disappearance of the deep inherent color of the respective mesoionic compound.

Example 2

An N-acryloyl derivative of an optically active compound was prepared analogously to a method for preparing N-methacryloyl-D,L-alanine.

For this purpose, the equivalent amount of acid chloride was added dropwise at 0° C. to D,L-phenylglycine dissolved in concentrated sodium hydroxide solution, and after the reaction time elapsed the product was precipitated with concentrated HCl.

The reaction, which proceeded with a 35% yield, resulted in colorless, needle-shaped crystals which were identified as N-acryloyl-D,L-phenylglycine by IR and NMR spectroscopy.

Similarly as for known [3+2] cycloadditions between 1,3-dithiolones and olefins, a mixture of N-acryloylphenylglycine and 0.9 mole equivalents of 2,5-diphenyl-1,3-dithiolylium-4-olate in toluene was heated at 80° C. over a period of 21 hours.

The course of the reaction may be observed for disappearance of the dark violet color of the mesoion. The precipitated light brown crystals (melting point 109.8° C.) were recrystallized from petroleum ether/acetic ester and methanol/water.

Example 2 shows the irreversible decoloration of the indicator system for a reaction with alkenes.

What is claimed is:

1. An application form comprising a container, said container comprising an indicator, said indicator being a temperature and/or irradiation and/or polymerization indicator comprising at least one 1,3-dipole and at least one dipolarophile, wherein the container is hermetically sealed with respect to mass transfer from outside the container, wherein the container is transparent or semitransparent to enable changes or alterations in color to be perceived by an observer, wherein the container comprises a partition that separates the dipolarophile and the 1,3-dipole, and wherein the partition may be removed from outside the container allowing the dipolarophile and the 1,3-dipole to react.

2. Application form according to claim 1, wherein the at least one 1,3-dipole is an ylide.

3. Application form according to claim 2, wherein the at least one 1,3-dipole is an ylide selected from the group consisting of azomethines, azomethinylides, carbonylylides, thiocarbonylylides, and 1,3-dithiolylium-4-olates.

4. Application form according to claim 1, wherein the at least one 1,3-dipole is an ylide which absorbs in the visible region of light.

5. Application form according to claim 1, wherein the at least one dipolarophile is a singly or multiply substituted alkene or alkyne.

6. Application form according to claim 1, wherein the at least one 1,3-dipole is a monomer from the group of acrylates and methacrylates.

7. Application form according to claim 1, which is a thermoindicator.

8. Application form according to claim 1, which is a photoindicator.

9. Application form according to claim 1, which is a combined thermoindicator and photoindicator.

10. Application form according to claim 1, comprising at least one colored 1,3-dipole and at least one dipolarophile, wherein the at least one colored 1,3-dipole and the at least one dipolarophile react irreversibly to form a colorless product when subjected to a sufficient change in temperature and/or light.

11. Application form according to claim 10, which is a 1,3-dipolar mesoionic heterocycle.

12. Method for indicating the end of reaction of a polymerizable mixture, comprising adding a 1,3-dipole to the mixture as an indicator, and indicating the end of the reaction by decoloration of the 1,3-dipole, wherein the 1,3-dipole is an ylide.

13. A method for polymerizing a polymerizable mixture while monitoring for completeness of said polymerizing, said method comprising:
(a) adding an indicator to said polymerizable mixture, wherein the indicator comprises at least one colored 1,3-dipole and at least one dipolarophile, wherein the at least one colored 1,3-dipole and the at least one dipolarophile react irreversibly to form a colorless product when subjected to a sufficient change in temperature and/or light;
(b) polymerizing the polymerizable mixture;
(c) observing a change in said indicator from colored to colorless during the course of said polymerizing; and
(d) accepting the change from colored to colorless as an indication that the polymerizing is complete.

* * * * *